(No Model.)
F. H. LUDINGTON.
BAG FASTENER.
No. 285,908. Patented Oct. 2, 1883.
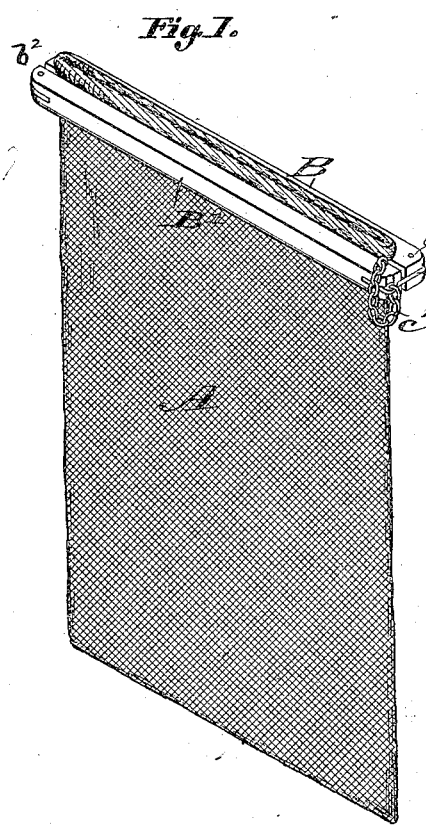
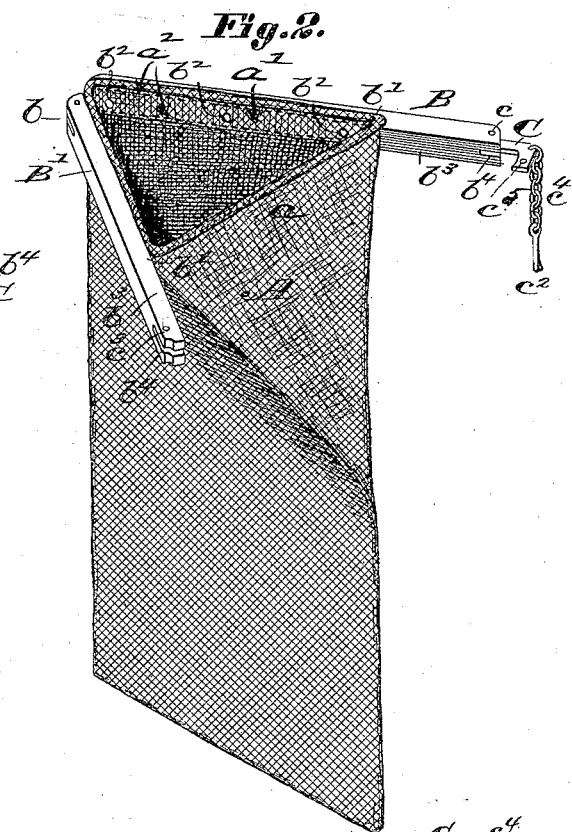
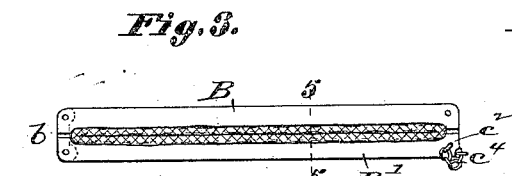
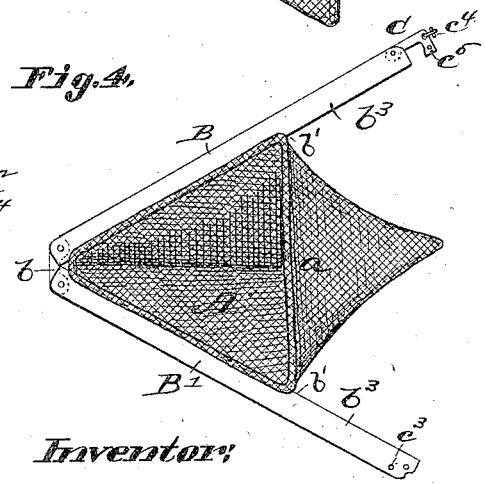
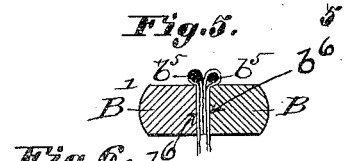
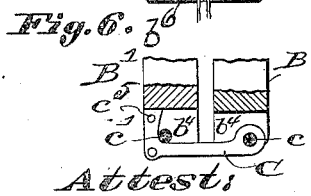
Attest:
Charles Pickles
Wm E. Hant
Inventor:
Francis H. Ludington
by C. D. Moody
atty

UNITED STATES PATENT OFFICE.

FRANCIS H. LUDINGTON, OF ST. LOUIS, MISSOURI.

BAG-FASTENER.

SPECIFICATION forming part of Letters Patent No. 285,908, dated October 2, 1883.

Application filed June 19, 1883. (No model.)

*To all whom it may concern:*

Be it known that I, FRANCIS H. LUDINGTON, of St. Louis, Missouri, have made a new and useful Improvement in Bag-Fasteners, of which the following is a full, clear, and exact description, reference being had to the annexed drawings, making part of this specification, in which—

Figure 1 is a view in perspective of a bag having the improved fastening, the bag being closed; Fig. 2, a view showing the bag open; Fig. 3, a top view of the bag closed; Fig. 4, a top view of the bag open; Fig. 5, a section on the line 5 5 of Fig. 3; and Fig. 6, a sectional detail, showing the latch used in locking the fastener.

The same letters of reference denote the same parts.

This improvement is especially adapted to what are termed "ore-bags," but can be used with other forms of bags.

The fastening consists, mainly, in two bars hinged together and attached to the bag, so as, when the bars are folded together, to embrace and close the bag, and when the bars are opened apart to distend the mouth of the bag sufficiently for it to be filled—that is, the bag, beginning at one end of its mouth and extending—say, about two-thirds the distance—toward the other end of the mouth, is fastened to the bars, leaving the remaining portion of the bag-mouth free, substantially as shown in the drawings, where A represents the bag, and B B' the bars, which are preferably of wood. The bars are hinged together at $b$, and from the vicinity of the hinge to the points $b' b'$, the bag is fastened to the bars, respectively, by means of the rivets $b^2 b^2$, Fig. 2. The portions $b^3 b^3$ of the bars being free of the bag, the bars can be unfolded and the bag opened, as shown in Figs. 2, 4. To fasten the bag the bars are folded and made to bind the entire mouth, including the portion $a$, substantially as represented in Figs. 1, 3, and the free ends of the bars are then locked together by some suitable device therefor, and preferably the latch C, which is pivoted at $c$ to the bar B, and made to hook around a pin, $c'$, in the bar B', as shown more distinctly in Fig. 6. To effectually prevent the latch from unhooking, a pin, $e^2$, is inserted in the bar B' and latch, as shown in Fig. 1, to receive which pin the bar is perforated at $c^3$ and the latch at $c^5$. The pin $c^2$ is preferably permanently secured to the latch by means of the chain $c^4$, which also is a convenience in unhooking the latch. The latch is preferably so attached to the bars as, when hooked, to lie entirely within the slots $b^4 b^4$ in the ends, respectively, of the bars B B', and to withdraw the latch therefrom the operator pulls the chain $c^4$. The perforations $c^3 c^5$ may also serve to hold a seal, in case it is desired to seal the bag.

The bag above the bars B B' is preferably corded, as shown at $b^5 b^5$, Fig. 5, to prevent it from being drawn downward between the bars. To more effectually fasten the bag to the bars the bag has a wide hem, $a'$, double-stitched at $a^2 a^2$—that is, the hem is stitched both above and below the line of rivets $b^2 b^2$. The hinged bars B B', thus made to embrace the bag-mouth, and adapted to be fastened together, can be used to fasten the bag, even if entirely detachable from the bag—that is, it is not essential to the closing and fastening of the bag that the bag be riveted or otherwise permanently attached to the bars. The pin $c^2$ is preferably a split pin.

I claim—

1. The combination of the bag A, the hinged bars B B', and the latch C, said latch being pivoted to the bar B and adapted to hook around the pin $c'$ in the bar B', substantially as described.

2. The combination of the bag A, the bars B B', the latch C, and the pin $c^2$, said latch being pivoted to the bar B, and said bar B' and latch being perforated, substantially as described.

3. The combination of the bars B B', having slots $b^4 b^4$, the latch C, the pin $c'$, the pin $c^2$, and the chain $c^4$, said latch, when hooked, lying in the slots $b^4 b^4$ in said bars, substantially as described.

4. The combination of the bag A, the bars B B', and the latch C, and the pins $c'$ and $c^2$, said bar B' being perforated at $c^3$ and said latch at $c^5$, as and for the purpose described.

FRANCIS H. LUDINGTON.

Witnesses:
C. D. MOODY,
J. W. SUTHERLAND.